United States Patent [19]

Bélanger et al.

[11] Patent Number: 4,517,265
[45] Date of Patent: May 14, 1985

[54] COMPOSITE AND FLEXIBLE ANODES FOR LITHIUM CELLS IN NON-AQUEOUS MEDIUM

[75] Inventors: André Bélanger; Denis Fauteux, both of Ste-Julie; Michel Gauthier, Laprairie, all of Canada

[73] Assignee: Hydro-Quebec, Montreal, Canada

[21] Appl. No.: 430,696

[22] Filed: Sep. 30, 1982

[30] Foreign Application Priority Data

Jun. 30, 1982 [CA] Canada .................................... 406358

[51] Int. Cl.$^3$ .......................... H01M 4/62; H01M 4/60
[52] U.S. Cl. ..................................... 429/217; 429/216; 429/212; 429/192; 252/182.1
[58] Field of Search ................................ 429/212–215, 429/192, 216, 217; 423/439; 252/182.1

[56] References Cited

U.S. PATENT DOCUMENTS

| | | | |
|---|---|---|---|
| 3,773,557 | 11/1973 | Mead | 429/192 X |
| 4,060,673 | 11/1977 | Dey | 429/192 |
| 4,303,748 | 12/1981 | Armand et al. | 429/192 |
| 4,358,513 | 11/1982 | Kaun | 252/182.1 X |

FOREIGN PATENT DOCUMENTS

| | | | |
|---|---|---|---|
| 2442514 | 7/1980 | France | 429/217 |
| 0756526 | 8/1980 | U.S.S.R. | 429/217 |

Primary Examiner—Brian E. Hearn
Assistant Examiner—Stephen J. Kalafut
Attorney, Agent, or Firm—Oblon, Fisher, Spivak, McClelland & Maier

[57] ABSTRACT

Anode composition based on a mixture of plastic or elastomeric macromolecular material with ionic conduction, an alloy of lithium and particles of a carbon compound of the formula: $Li_xC$ where $0 \leq x < 0.3$. Anodes so constituted, as well as electrochemical generators with solid electrolytes comprising these anodes. Better utilization of the lithium of the materials of the electrodes.

18 Claims, 3 Drawing Figures

COMPOSITE AND FLEXIBLE ANODES FOR LITHIUM CELLS IN NON-AQUEOUS MEDIUM

BACKGROUND OF INVENTION (a) Field of the Invention

The invention is directed to rechargeable or non-rechargeable lithium cells which operate in a non-aqueous medium at temperatures which do not generally exceed 175° C. More specifically, the invention relates to the composition of soft composite anodes which supply lithium, and can be produced as thin films and comprises the following elements: a finely divided alloy or intermetallic compound of lithium, a plastic or elastomeric macromolecular material with ionic conduction and a finely divided carbon additive. The invention relates to the use of these anodes in electrochemical generators, which can be prepared as thin films.

The use of plastic or elastomeric polymers as electrolytes enables to eliminate some disadvantages of liquid electrolytes (convection, problems of imperviousness . . . ) while overcoming the major difficulty of solid electrolytes which are crystalline or glassy, i.e. loss of contact between the electrolyte and the materials of the electrodes resulting from variations in the volumes of the electrodes during the operation thereof.

(b) Description of Prior Art

The French Patent Applications of Michel Armand and Michel Duclot, Nos. 78.32976, 78.32977 and 78.32978, now published under Publication Nos. 2,442,512, 2,442,514 and 2,442,513, advocate the use of solid elastomeric materials with ionic conduction as electrolyte in an electrochemical generator whose anode may consist of an alkaline metal, an alloy and/or an insertion compound which can release an alkaline cation. Among the alkaline metals, lithium is particularly interesting.

The present invention intends to optimize the composition and the operation of composite anodes, which preferably work with lithium and utilize such types of polymeric complexes (solvating polymer plus lithium salt) as electrolytes.

The applicant has observed that the designing of generators with thin films of the order of 100 μm per elementary cell presents some technical difficulties for the formation of metallic lithium as thin films and of a quality sufficient to be compatible with thin cells using polymers for the electrolytes. Moreover, it has been observed that for rechargable cells, the use of metallic lithium is limited because of the problems resulting from the formation of dendrites and the passivation of the interfaces. Efforts have therefore been directed towards high activity lithium metallic alloys, such as lithium-aluminium, lithium-silicon and lithium-bismuth.

These materials, which can be ground by known processes, possess many characteristics which make them particularly well suited to batteries operating with ionic polymers (thin films). It is indeed possible to prepare on a large scale composite materials (alloy in powder form plus electrolyte) for example from a suspension in an organic medium. These composite electrodes then have a large specific area which enables the use of electrode materials in which the diffusion coefficients of lithium are relatively low.

Moreover, the use of powders of metallic alloys has many advantages such as:

the possibility of using thin electrode materials ($\lesssim 100$ μm) by a plurality of methods, such as: pressing, sprinkling, suspension, coating, etc . . . ;

multiplying the real surface of the active material in contact with the electrolyte and the current collector.

The only disadvantage of using lithium alloys is the drop in the coefficient of activity of lithium in the alloy, which represents a decrease of the potential of the electrode of 160 mV for $Li_3Si$ and of 900 mV for $Li_3Sb$ with respect to metallic lithium.

Unfortunately, on the side of the anode, most of the powders of lithium alloys are very reactive and are very easily passivated in spite of all the precautions taken when handling them. The result is a multiplication of the resistive contacts which are inherent to the fine powders, which means a bad distribution of the potential in the mass of the material leading to a bad utilization of the lithium of the electrode of the order of 3%.

The description made by Armand in the French patent applications mentioned above, does not always permit to obtain an active material especially at the negative electrode. This is particularly true for the powders of negative electrodes where one constantly faces problems resulting from the use of lithium, which seem due on the one hand to the multiplication of the resisting contacts which are inherent in fine powders and, on the other hand, to the presence of passivating layers at the surface of the grains which limit the transport of the active materials to the interfaces.

To overcome this problem it has been proposed to change the composition of the materials of the anodes by adding various additives which will appreciably modify the behavior of the composite electrodes as a source and receiver of lithium.

Various methods have been proposed to improve the operation of the lithium electrodes, such as lithium-aluminium in a salt melt or in an organic medium. These methods, described in U.S. Pat. No. 4,158,720 (negative electrode consisting of lithium-aluminium-iron), U.S. Pat. No. 4,130,500 (negative electrode consisting of lithium-aluminium-magnesium), U.S. Pat. No. 4,002,492 (anode consisting of an agglomerated alloy of lithium-aluminium) and in U.S. Pat. No. 3,957,532 (anode obtained from an alloy of lithium-aluminium containing a metallic mesh) do not seem to overcome all of the difficulties mentioned above.

More recently, in a study relating to various additives for improving the loss of capacity of the cycling of lithium-aluminium electrodes in molten salt cells, such as in a LiCl-KCl medium, T. D. Kaun and William G. Reder (The Electrochem, Soc., Spring Symp., May 9-14 1982, Montreal, Quebec, Canada, Abstract No. 345) mention the beneficial effect, in some cases, of adding 3 to 5% of an inert charge, with respect to the volume of the electrode, said charge being either a semi-conductor, carbon, an insulating material, MgO, or a metallic conductor, AlFe, all of these in powder form of about 75 μm in diameter.

The improvements to the cycling are substantial, but there is little or nothing to be gained on the utilization. On the other hand, improved performances seem to be connected, according to Kaun and Reder, to the absence of sintering of the lithium-aluminium powders when carbon, MgO or AlFe are added thereto. The electrodes of Kaun and Reder are different from the electrodes according to the present invention both in their formulation and in the experimental conditions under which they can be used: molten electrolyte (400°–500° C.), sintering or agglomeration of lithium-aluminium during cycling, different proportions, etc.

At low temperature, as is the case when the electrodes according to the present invention are used, it is obvious that there are not sintering problems, or at least, if there are some, they are not significant. Consequently, the addition of carbon in the case of Kaun et al does not play an equivalent role to that of the electrodes according to the present invention, because with molten salts, the substitution of carbon by MgO produces the same beneficial effect.

On the other hand, preliminary tests on the addition of MgO powder to the material of the electrode have been found to be without effect on the use of the materials of the electrode according to the present invention. Similarly, the addition of electronic conducting material such as powdered nickel or copper, does not result in any interesting improvement with respect to the use of lithium-aluminium. At the most, these additions permit to increase the use of lithium-aluminium to 5–6%, while it is normally of the order of 3% without additives. This improvement can easily be related to a better conductivity of the material.

It has been realized according to the present invention that it is possible to overcome the problem of the use of lithium or other alkaline metals, such as sodium resulting from the use of fine powders which are prepared as thin films (<50 μm) by adding to the composition of the electrode particles of carbon, such as graphite or blacks, for example acetylene blacks which contain little impurities capable of reacting with the lithium alloys. A good description and definition of the blacks will be found in "Kirk-Othmer Encyclopedia of Chemical Technology", Vol. 4, pp. 243–282, Second Edition, 1967, John Wiley & Sons. In this manner, the use of lithium is substantially increased (>50%) without substantially reducing the potential of the cell or of the added material. The mechanism which explains this improvement is not well understood but would seem to imply more than a mere improvement of the electronic conductivity of the material of the electrode. The formation of a compound of insertion Li<C> could for example be one of the reasons for the effect which is observed.

The inventors have noted that under the conditions of the preparation of the anode according to the present invention, the blacks could insert the lithium at potentials lower than +1.2 volts with respect to a lithium electrode. They have also noted that under these conditions, the total coefficient of diffusion of the lithium in the anode is then improved.

The noted increase of the electronic conductivity of the materials due to the presence of metal powders, grahite or blacks, is superior in the case of the addition of blacks, even at lower volume contents, because of their large dispersion and/or specific area. It has also been noted that the blacks enable to improve by a factor of five and even by a factor of ten, in certain cases, the use of the lithium in the material of the electrode.

Even though the use of additives such as blacks is well known for positive electrodes, in order to improve the collection of current and the distribution of the potential, this necessity does not generally arise on the side of the negative electrodes when metals or alloys are used. These metals or alloys possess sufficient electronic conductivity and are generally compacted or are bound by pressing or sintering. This is for example the case when an alloy of lithium-aluminium is used in molten salt batteries (U.S. Pat. No. 3,445,288) or in an organic liquid (U.S. Pat. No. 4,002,492) where the electrodes are generally thick and rigid and consequently not very adaptable to the concept of thin film batteries.

On the other hand, taking into account the possible reaction between the lithium and the carbon additive under the conditions according to the present invention, it is obvious that the use of a black or a graphite pre-inserted with lithium falls within the scope of the present invention.

The invention is distinguished by the fact that it enables to obtain an electrode based on an alloy of lithium having a large exchange surface which can be prepared in the form of a thin film by using as an electrolyte a polymer which is binding and flexible and makes it possible to maintain the contacts during cycling and absorbs the variations of the volume of the electrodes, said electrode also containing a carbon additive to optimize the use of the active material while enabling the assembly of the composite electrode to retain its plastic and elastomeric properties.

SUMMARY OF INVENTION

The invention therefore relates to an anode composition comprising in combination the following mixture:

a plastic or elastomeric macromolecular material with ionic conduction;

a finely divided alloy of lithium the granulometry of which is lower than 40 μm and selected so that the activity of the lithium in said alloy corresponds to potentials lower than +1.2 volts with respect to a lithium electrode;

particles of a carbon compound of the formula: $Li_xC$ where $0 \leq x < 0.3$, the particles of the carbon compound being finely divided to a granulometry lower than 40 μm.

Preferably, the plastic or elastomeric macromolecular material which is ionically conductive partly or entirely comprises homo- and/or copolymers, which are essentially derived from one or more monomers having a hetero-atom which is capable of adequate solvation with the cation $Li^+$ and a lithium salt.

The preferred lithium salt is selected from the group consisting of $LiClO_4$, $LiI$, $LiCF_3SO_3$, $LiSCN$, $LiBF_4$, $LiB\phi_4$, $LiPF_6$, $LiAsF_6$, $LiCF_3CO_2$ and $LiBH_4$.

Other salts that can be used include those lithium salts described by F. C. Herkaoui, in the 3rd cycle thesis, entitled "Synthèses et études de nouveaux anions pour les électrolytes solides polymères", l'Institut National Polytechnique de Grenoble, June 1, 1982. For example, these salts can correspond to those having the following general formula:

$$Li_2B_nX_aY_b \qquad (I)$$

in which n is a whole number equal to one of the values 8, 10 and 12, X and Y are the same or different and each represents a member selected from hydrogen, halogens, the radical CN and the hydrocarbon radicals such as those comprising 1 to 3 carbon atoms, a and b are whole numbers whose sum is equal to n.

$$(R-C\equiv C)_4 X^-, Li^+ \qquad (II)$$

in which:
X is a trivalent element which can have 4 coordinated valences, selected among boron or aluminium, the groups R are aprotic hydrocarbon radicals, i.e. radicals which are not proton donors.

$$[AlO_4(SiR_3)_4]^-Li^+ \quad (III)$$

in which the groups R are aprotic hydrocarbon radicals, i.e. radicals which are not proton donors.

$$(C_nX_{2n+1}Y)_2N^-, Li^+ \quad (IV)$$

in which:
X is a halogen;
n varies between 1 and 4;
Y is CO or $SO_2$.

More specifically, among the compounds of formula (I), $Li_2B_{12}H_{12}$ is preferred, among the compounds of formula II, $Li(C_4H_9-C\equiv C)B$ is preferred, among the compounds of formula III, 1 tetrakis(trimethylsiloxy)alanate is preferred, among the compounds of type (IV), lithium bis(trifluoromethylacetyl)imide and lithium bis(trifluoromethylsulfonyl)imide are preferred.

A preferred plastic or elastomeric macromolecular material with ionic conduction is selected from the group consisting of homopolymers and copolymers of ethylene oxide, propylene oxide and methyl glycidyl ether.

Preferably, the lithium alloy is selected from the group consisting of:
lithium-aluminium;
lithium-silicon;
lithium-antimony;
lithium-bismuth;
lithium-boron;
finely divided lithium.

According to the present invention, the particles of the carbon compound are preferably selected from the group consisting of powdered graphite and blacks, for example acetylene blacks.

The particles of graphite usually vary between 1 and 40 μm. With respect to the blacks, they are generally smaller than 1 μm, for example between 0.02 μm and 1 μm.

When there are used particles of the carbon compound of formula $Li_xC$ where x=0, the value of x is usually close to 0.15.

Generally, the composition according to the invention comprises about 15 to 70 volume % of alloy, about 5 to 40 volume % of particles of the carbon compound, the balance comprising the plastic macromolecular material; preferably, about 35 to 55 volume % of alloy, about 15 to 20% of carbon particles, the balance comprising the plastic macromolecular material.

For the examples which follow, the polymeric electrolyte most frequently used is a high molecular weight polyethylene-oxide, for example 900,000 complexed with a lithium salt, usually $LiClO_4$ or $Li_2B_{12}H_{12}$. The ratio oxygen/lithium of the complex which is formed with the perchlorate is ultimately about 8/1, although this example is not intended to be limiting.

The examples illustrating the performances of the composite anodes according to the invention have been carried out in complete generators using an electrolyte of the same nature, made of a film about 75-100 μm thick and composite cathodes generally containing $TiS_2$ or $V_6O_{13}$ in excess quantities with respect to the lithium alloy used. A cathode composition frequently used was for example by volume:
40%: $TiS_2$ 17%: graphite
43%: $PEO-LiClO_4$ complex in a ratio O/Li=8

The experimental cell used in the examples described below include a lithium referenced electrode which enables to follow independently the evolution of the potential of the anode.

The anodes used in these examples have been mainly obtained by the following two methods:
pressing while hot at a temperature higher than the melting point of the polymer the various components in powder form;
or preparation of a thin film anode by means of known methods of painting or printing by solubilizing or suspending the polymeric electrolyte, the carbon additive and the alloy powder in compatible solvents, e.g. benzene, THF, dioxolane, etc., and the evaporation and the drying of the films obtained.

It goes without saying that any other method of preparation which is compatible with the components of the anodes described can also be used for the preparation of the films.

The invention will now be illustrated by means of the following non-limiting examples:

EXAMPLE 1 (without carbon)

Figure 1:
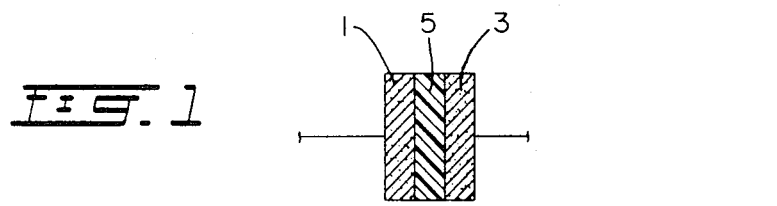
FIG. 1 is a schematic illustration of a cell including the anode according to the invention.

The material constituting the anode was prepared in the following manner: 33 mg of pyrometallurgical LiAl (50% at. Li) crushed and screened at −40 μm, 22 mg of commercial PEO in powder form and 11 mg of commercial $LiClO_4$ dried under vacuum at 200° C. to give a total quantity of 66 mg have been mixed in a mortar of which 41 mg have been pressed on a thin disc of stainless steel hving a 2.2 cm diameter (3.8 cm²). This material containing 57 C of lithium was placed inside a generator such as that illustrated in FIG. 1, where there is shown anode 1 as described, cathode 3 made of 40 volume % $TiS_2$ (−38 μm), 17 volume % of graphite (−38 μm) and 43 volume % of $PEO-LiClO_4$ complex in a ratio of O/Li=8, and wherein the thickness does not generally exceed 75 μm and the solid electrolyte 5 constituted of an elastomeric membrane 75 μm thick formed of the complex $PEO-LiClO_4$ in a ratio of O/Li=8. The generator was warmed to its temperature of operation, in this case 112° C. Thereafter, the cell was discharged at currents varying between 80 μA and 300 μA. The discharge was considered terminated when the potential of the anode reached +1.2 V with respect to a lithium referenced electrode, not illustrated in the drawings: a total of 2.5 Coulombs of lithium have been oxidized which corresponds to a utilization of 4.3% of the material.

EXAMPLE 2 (without carbon)

In this example, the material of the anode was manufactured within the following proportions: 0.6 g of LiAl (46% at.) crushed and screened at −38 μm have been mixed in a mortar with 0.3 g of commercial PEO having a molecular weight of 900,000 and 0.12 g LiClO$_4$. From this mixture 56 mg have been pressed on a thin stainless steel disc and placed into a generator such as the one described in Example 1. At 112° C., the cell was discharged at 25 μA·cm$^{-2}$ for a total of 7.4 Coulombs when the electrode reached a potential of +1 V vs a lithium referenced electrode.

Use of the material is then 8% electrode content: 92 Coulombs). A similar test was carried out with LiAl (75% at.) in the following proportions (0.58 g LiAl, 0.30 g PEO+0.15 g LiClO$_4$) and gave a rate of use slightly lower, i.e. 6% (12 Coulombs on 186 Coulombs present) but at a discharge current of 130 μA·cm$^{-2}$.

EXAMPLE 3 (without carbon)

Figure 2:
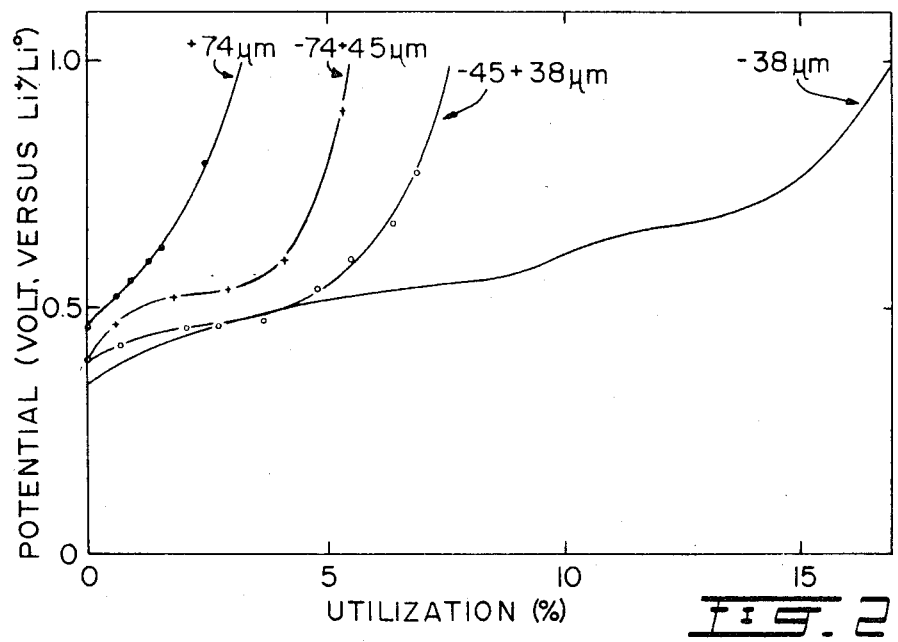
FIG. 2 illustrates the evolution of the potential of the anode during discharge as a function of its use in the case of anodes containing no particles of a carbon compound.

In this example, the composite electrodes have been disposed on thin stainless steel discs of 4 cm$^2$ and had the following composition: 80 wt.%, i.e. 40 mg of pyrometallurgical lithium-aluminium containing 50% at. of lithium and 20 wt. %, i.e. 10 mg of poly(ethylene-oxide)+5 mg of LiClO$_4$. Various assemblies have been made according to the composition described, with powders of lithium-aluminium of various granulometry. The behaviors observed at the discharge of the anodes assembled in this manner with the electrolytes and cathodes similar to those of Example 1 for a final potential of 1.0 volt versus metallic lithium, a current density of 25 μA/cm$^2$ and a temperature close to 105° C. are illustrated in FIG. 2 and show the influence of the granulometry of the lithium-aluminium.

EXAMPLE 4 (with and without carbon)

In this test, anodes containing lithium have been prepared from a commercial LiSi alloy (44 wt. % of lithium). The proportions used were the following: 540 mg of LiSi (−38 μm) and 270 mg of POE having a molecular weight of 900,000+130 mg of LiClO$_4$. After having intimately mixed the two components, 43 mg have been pressed on a metallic support for a lithium content on the electrode of 173 Coulombs. In the second assembly, to the material, graphite was added in the following proportions: 180 mg of LiSi (<38 μm), 50 mg of graphite (<38 μm) and 120 mg of powdered PEO (molecular weight 900,000)+50 mg of LiClO$_4$, from which, once the powders have been mixed, a sample weighing 42 mg has been pressed on a metallic support which is identical to that described above. The capacity of the electrode is 130 Coulombs of lithium. These two anodes were mounted in generators and discharged under very close experimental conditions (temp.=104° C., current=130 μA·cm$^{-2}$). In the first case, 6% of the lithium content has been used, while in the second case (in the presence of graphite) 17% of the material shows lithium activity. Other tests have shown that the presence of graphite in proportions varying between 5–30 volume % could double and sometimes triple the use of the lithium alloys.

Example 5 (with carbon)

In this example, composite anodes of lithium-aluminium (50% at. of lithium), of carbon additive and of polyether have been prepared in the following proportions:

(1)—51 wt. %, i.e. 2.15 g of LiAl powder screened at −38 μm and 9.5 wt. %, i.e. 0.40 g of graphite powder screened at −38 μm have been intimately mixed. From this mixture, 1.44 g has been sampled and added to the binder which was a PEO having a molecular weight of 900,000. The weight ratio of the active material plus additive versus the binder was 4. This material has been placed on a stainless steel support of 4 cm$^2$.

(2)—68 wt. %, i.e. 2.00 g of LiAl powder screened at −38 μm and 10 wt. %, i.e. 0.30 g of Shawinigan carbon black having a granulometry lower than 1 μm has been imtimately mixed. From this mixture, 1.15 g was sampled and added to a binder which was made of POE (900,000). The weight ratio of the active material plus additive versus the binder was 3.8. This material has been placed on a stainless steel support of 4 cm$^2$.

Figure 3:
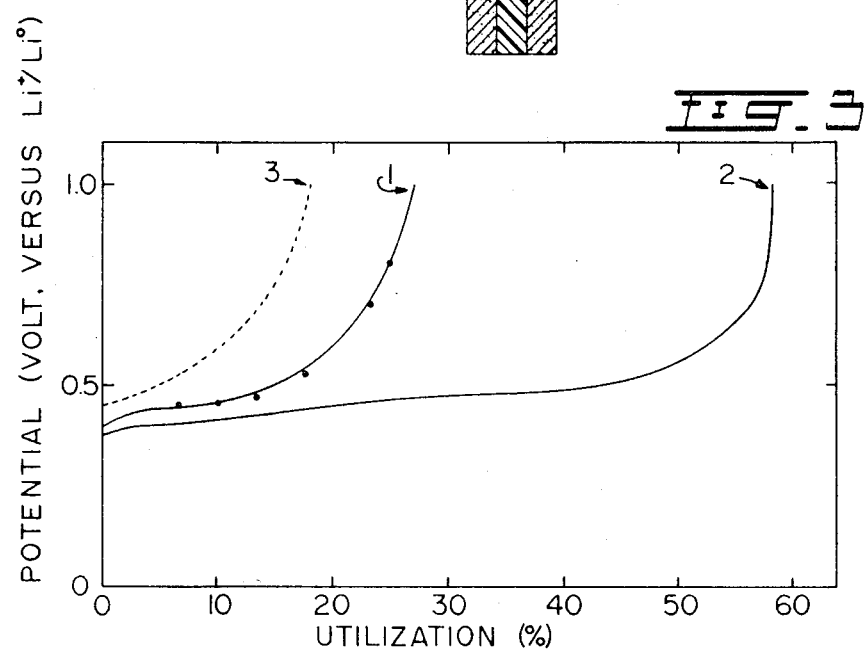
FIG. 3 illustrates the evolution of the potential of the anode during discharge as a function of its use in the case of anodes containing particles of a carbon compound.

Two generators have been assembled and the anodes were discharged under the following conditions: 110° C., 25 μA/cm$^2$. In the two cases higher utilization than those obtained for LiAl powders containing no additive have been observed and are given in FIG. 3, where the curve 3 is taken from Example 3 as a reference. From the anode 1, containing graphite, about 28% of the lithium content has been used, from the anode 2, containing carbon black, about 57% of the content of lithium has been used.

EXAMPLE 6 (with carbon)

By using the method described in Example 5(2), but by replacing the PEO (900,000) by a mixture of 95% PEO and 5% polymethyl glycidyl ether, the same results were obtained.

EXAMPLE 7 (with carbon)

By using the method described in Example 5(2), but by replacing the PEO (900,000) by a mixture of 95% PEO and 5% poly(propylene-oxide), the same results were obtained.

EXAMPLE 8 (with carbon)

By using the method described in Example 5(1), but by replacing the lithium perchlorate with lithium iodide, Li$_2$B$_{12}$H$_{12}$ or LiCF$_3$SO$_3$, the same results were obtained.

Even though the examples given above, as well as the description which precedes, deal mainly with lithium, it is understood that the use of any other alkaline metal, such as sodium, falls within the scope of the present invention.

We claim:

1. An anode in the form of a flexible composite thin film comprising a composition of the combination of the following ingredients:
    a plastic or elastomeric macromolecular material with ionic conduction;
    a finely divided alloy of lithium having a granulometry lower than 40 μm and selected so that the activity in the lithium in said alloy corresponds to potentials which are lower than +1.2 volts with respect to a lithium electrode; and
    particles of a carbon compound of the formula: Li$_x$C where $0 \leq x < 0.3$, said particles of the carbon compound being finely divided to a granulometry lower than 40 μm, and being present in an amount ranging from about 15 to about 40 volume percent of the anode composition.

2. An anode in the form of a flexible composite film whose composition comprises in combination the following mixture:
    a plastic or elastomeric macromolecular material which ionic conduction;

a finally divided alloy of lithium having a granulometry lower than 40 μm and selected so that the activity in the lithium in said alloy corresponds to potentials which are lower than +1.2 volts with respect to a lithium electrode; and particles of a carbon compound of the formula: $Li_xC$ where $0 \leq x < 0.3$, said particles of carbon compound being finally divided to a granulometry lower than 40 μm.

3. A composition according to claim 1, or 2 in which the plastic or elastomeric macromolecular material with ionic conduction includes, partly or wholly, homo- and/or copolymer, derived from one or more monomers having a hetero-atom which can adequately dissolve the cation Li+ and a salt of lithium.

4. A composition according to claim 3, in which the salt of lithium is selected from the group consisting of $LiClO_4$, $LiI$, $LiCF_3SO_3$, $LiSCN$, $LiBF_4$, $LiB\phi_4$, $LiPF_6$, $LiAsF_6$, $LiCF_3CO_2$ and $LiBH_4$.

5. A composition according to claim 3, in which the salt of lithium is selected from the group consisting of salts of the general formula (I):

$$Li_2B_nX_aY_b \qquad (I)$$

in which n is a whole number which is equal to 8, 10 or 12, X and Y are the same or different and each represents a member selected from the group consisting of hydrogen, halogens, the radical CN and the hydrocarbon radicals having 1 to 3 carbon atoms, a and b are whole numbers whose sum is equal to n.

6. A composition according to claim 3, in which the salt of lithium is selected from the group consisting of salts of the general formula:

$$(R-C\equiv C)_4X^-, Li^+ \qquad (II)$$

in which:

X is a trivalent element which can have a coordination number of 4, selected from boron or aluminium, the groups R are aprotic hydrocarbon radicals, which are radicals which do not yield protons;

$$[AlO_4(SiR_3)_4]^- Li^+ \qquad (III)$$

in which the groups R are aprotic hydrocarbon radicals, which are radicals which do not yield protons;

$$(C_nX_{2n+1}Y)_2N^-, Li^+ \qquad (IV)$$

in which:

X is a halogen;

n varies between 1 and 4;

Y is a CO or $SO_2$ group.

7. A composition according to claim 5, in which the salt of lithium is $Li_2B_{12}H_{12}$.

8. A composition according to claim 6, in which the salt of lithium is selected from the group consisting of $Li(C_4H_9-C\equiv C)_4 B$, lithium 1 tetrakis(trimethylsiloxy)alanate, lithium bis(trifluoromethylacetyl)imide and lithium bis(trifluoromethyl-sulfonyl)imide.

9. A composition according to claim 3, in which the plastic or elastomeric macromolecular material with ionic conduction is selected from the group consisting of homopolymers and copolymers of ethylene oxide, propylene oxide and methyl glycidyl ether.

10. A composition according to claim 1, in which the lithium alloy is selected from the group consisting of:
lithium-aluminium;
lithium-silicon;
lithium-antimony;
lithium-bismuth;
lithium-boron;
finely divided lithium.

11. A composition according to claim 1, in which the particles of the carbon compound are selected from the group consisting of powdered graphite, and carbon blacks.

12. A composition according to claim 11, in which the particles of the carbon compound are carbon blacks having a granulometry between 0.02 μm and 1 μm.

13. A composition according to claim 11, in which the particles of the carbon compound consist of particles of graphite the granulometry of which varies between 1 and 40 μm.

14. A composition according to claim 12, in which the carbon blacks are selected from acetylenic blacks.

15. An anode according to claim 2, in which the particles of the carbon compound comprise $Li_xC$ where x is about 0.15.

16. A composition according to claim 1, comprising about 15 to 70 volume % of alloy, about 15 to 40 volume % of particles of the carbon compound, the balance comprising the plastic or elastomeric macromolecular material with ionic conduction.

17. A composition according to claim 1, comprising about 35 to 55 volume % of alloy, about 15 to 20 volume % of particles of the carbon compound, the balance comprising the plastic or elastomeric macromolecular material with ionic conduction.

18. An anode for an electrochemical cell comprising a current collector on which is deposited a film having a composition as defined in claims 1, 3 or 4, the total thickness of the anode not exceeding 75 μm.

* * * * *